US011852123B1

United States Patent
Henry, Jr.

(10) Patent No.: US 11,852,123 B1
(45) Date of Patent: Dec. 26, 2023

(54) WINDMILL OIL BATH GEARTRAIN

(71) Applicant: Mark A. Henry, Jr., Kirksville, MO (US)

(72) Inventor: Mark A. Henry, Jr., Kirksville, MO (US)

(*) Notice: Subject to any disclaimer, the term of this patent is extended or adjusted under 35 U.S.C. 154(b) by 0 days.

(21) Appl. No.: 18/144,899

(22) Filed: May 9, 2023

(51) Int. Cl.
F16H 57/038 (2012.01)
F03D 80/70 (2016.01)
F16H 57/04 (2010.01)
F16H 1/20 (2006.01)

(52) U.S. Cl.
CPC .............. F03D 80/70 (2016.05); F16H 1/203 (2013.01); F16H 57/038 (2013.01); F16H 57/045 (2013.01); F16H 57/0424 (2013.01); F16H 57/0427 (2013.01); F16H 57/0457 (2013.01); F16H 57/0471 (2013.01); F05D 2260/4031 (2013.01); F05D 2260/98 (2013.01)

(58) Field of Classification Search
CPC ........ F03D 80/70; F16H 1/203; F16H 57/038; F16H 57/0424; F16H 57/0427; F16H 57/045; F16H 57/0457; F16H 57/0471; F05D 2260/4031; F05D 2260/98
See application file for complete search history.

(56) References Cited

U.S. PATENT DOCUMENTS

| 1,523,296 | A | | 2/1924 | Ryan | |
|---|---|---|---|---|---|
| 1,909,216 | A | | 6/1929 | Newman | |
| 1,843,070 | A | * | 1/1932 | Shoemaker | F16N 7/18 475/160 |
| 2,069,571 | A | * | 2/1937 | Andrew | F03D 80/70 184/6.12 |
| 2,517,913 | A | * | 8/1950 | Nickle | F16H 57/0421 384/135 |
| 8,167,758 | B2 | * | 5/2012 | Downs | F16H 57/0483 184/6.12 |

* cited by examiner

Primary Examiner — Thomas C Diaz
(74) Attorney, Agent, or Firm — Dale J. Ream

(57) ABSTRACT

An oil bath geartrain for a powermill includes a gear casing defining an interior area having an oil reservoir that maintains a predetermined oil level and which includes structures for continuously distributing oil to gear teeth and babbitt bearings so that recurrent servicing of gear-related components is not necessary. The oil bath geartrain includes an oil lift gear having teeth that lift oil from the oil reservoir and then lubricates and input shaft bearing and communicates that oil via an oil ring so as to lubricate an intermediate shaft bearing. The oil ring acts as an oil scraper. The oil bath geartrain includes a main pinion gear, intermediate pinion gear, and accommodation of miter gears coupled to the output shaft. Another oil scraper plate communicates oil from the main pinion gear to the output shaft miter gear teeth. The gear casing includes passages for communicating oil to input shaft bearings.

13 Claims, 10 Drawing Sheets

WINDMILL OIL BATH GEARTRAIN

BACKGROUND OF THE INVENTION

This invention relates generally to lubrication devices for gears and, more particularly, to an oil bath geartrain for a power windmill.

Lubrication is needed in a gear system to counteract the effects of friction. As a gear interacts with another gear, the motion is transmitted via surface contact. The interaction of the surfaces on each gear creates friction. The friction, in turn, creates heat and it is the heat of the interaction that causes premature failure of the gears. Consumers are most aware of the importance of maintaining fresh oil in their automobiles so as to protect and enhance the smooth operation of their automobile's motor and, thus, the overall gear train. But, just as it is important to regularly change the oil in an automobile gear train, it is equally important to change or add lubrication to the gears in other machines. For example, many machines have grease valves or housings that must be opened and an oil can used to apply fresh or additional oil to a set of gears.

More particularly, a geartrain used for operating a wind-driven windmill requires regular lubrication in order to function smoothly and avoid damage or breakage. Unfortunately, wind-driven windmills which were once commonly found on farms throughout the country have fallen into substantial disrepair and require major repairs to become operable once again. In fact, entire gear trains for windmills must often be entirely replaced because they were not oiled and serviced on a regular basis.

Because wind-driven windmills often go years without being regularly oiled or serviced, it would be desirable if the windmill gear trains were designed to be continuously oiled without a requirement for human servicing.

Therefore, it would be desirable to have an oil-based power mail having a geartrain that is sealed and bathed continuously in oil such that friction and damaging heat is avoided. A power-windmill (or, in short, a powermill) is a type of windmill that uses the rotation of gears as a result of its blades harnessing wind power to do "work" such as to turn a rod of a generator to generate electricity, to power a machine, or to power an actual wood mill or other industrial plant, etc.

SUMMARY OF THE INVENTION

This invention is directed to an oil-bath geartrain for a windmill that includes a gear casing that receives an input shaft from the windmill blades and the geartrain, the casing including an oil reservoir and special structures for lubricating bearings and gear teeth. Specifically, the invention includes an oil lift gear having teeth configured to pick up oil from the oil reservoir for lubricating an input shaft bearing. The invention also includes an oil ring having a scraper configured to deliver oil to an intermediate shaft bearing. Further, the oil-bath geartrain includes a main pinion gear, an intermediate pinion gear, and a combination intermediate shaft miter gear and output shaft miter gear better coupled to the output shaft which is connected to a generator. Another oil scraper delivers oil picked up by the main pinion gear to the output shaft miter gear. As will be described in more detail, all the gear teeth and Babbitt bearings are continuously lubricated as the power mill does its work.

Therefore, a general object of this invention is to provide an oil-bathed powermill that includes a sealed geartrain casing that is filled with or siphons oil to its gears and, specifically, to its multiple babbitt bearings.

Another object of this invention is to provide an oil-bath geartrain for a windmill, as aforesaid, that includes a sealed casing substantially filled with oil and operable gears.

Still another object of this invention is to provide a geartrain for a windmill as aforesaid, that does not require regular lubrication to function efficiently for many years.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 3b is an isolated view on an enlarged scale taken from FIG. 3a;

FIG. 4 is a front view of the oil bath geartrain as in FIG. 3a;

FIG. 6b is an isolated view on an enlarged scale taken from FIG. 6a;

FIG. 7b is a sectional view taken along line 7b-7b of FIG. 7a;

FIG. 7c is a sectional view taken along line 7c-7c of FIG. 7a; and

FIG. 7d is a sectional view taken along line 7d-7d of FIG. 7a.

DESCRIPTION OF THE PREFERRED EMBODIMENT

Figure 1:
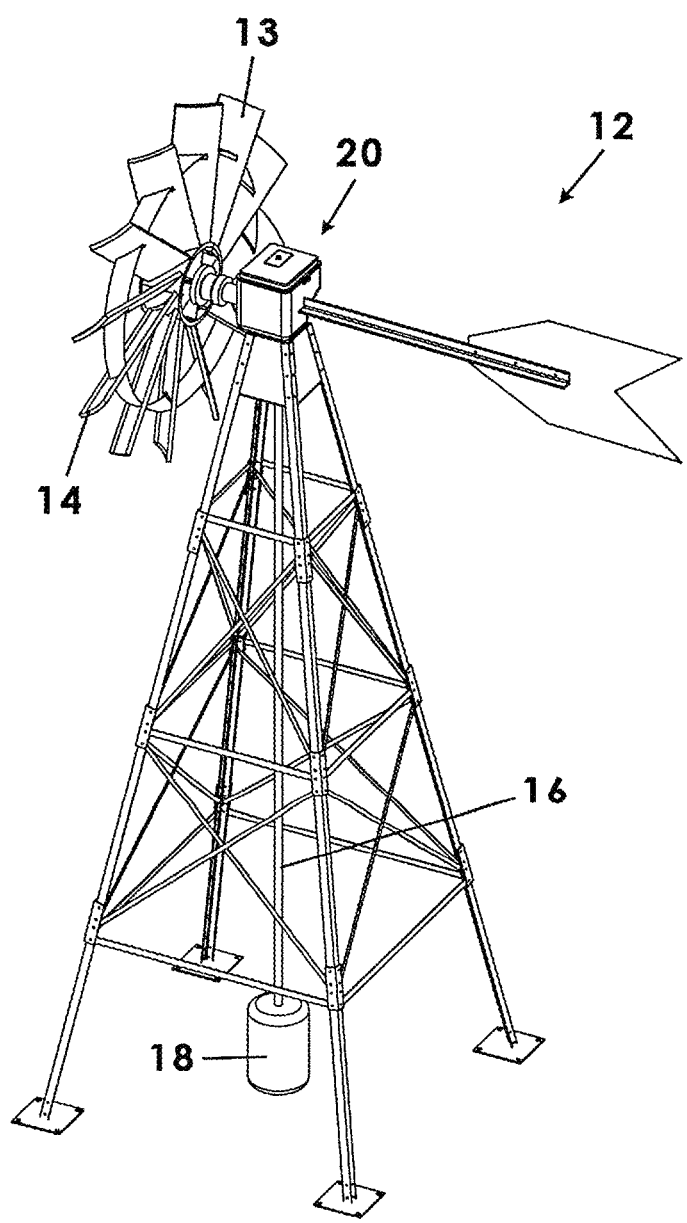
FIG. 1 is a perspective view of an oil bath geartrain for a powermill according to a preferred embodiment of the present invention.
Figure 2:
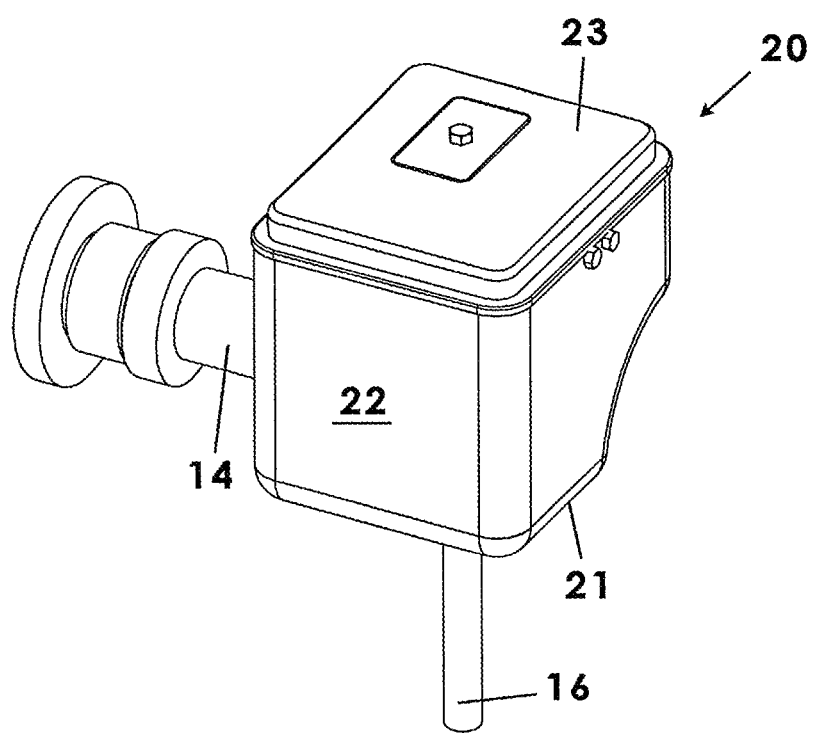
FIG. 2 is a perspective view of the oil bath geartrain as in FIG. 1, illustrated with the windmill removed for clarity.
Figure 3A:
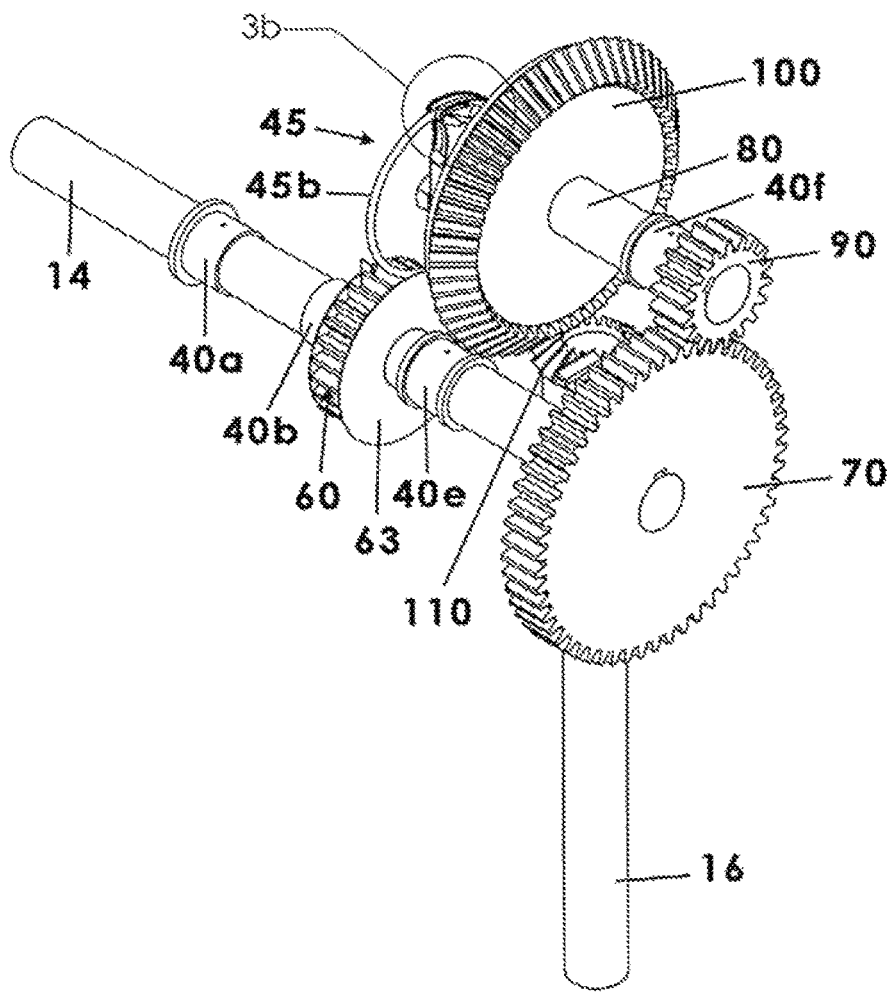
FIG. 3a is a perspective view of the oil bath geartrain as in FIG. 2, illustrated with the gear casing removed for clarity.
Figure 3B:
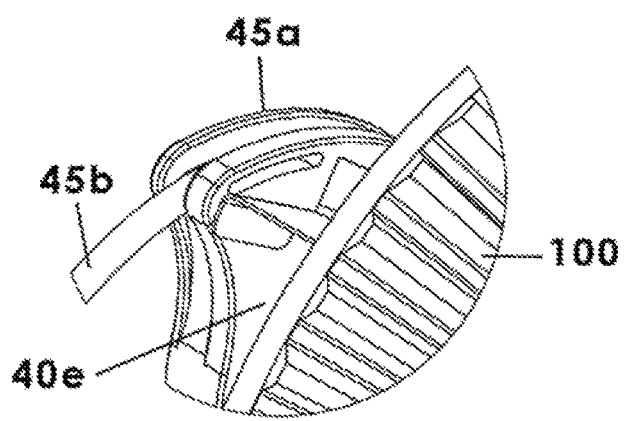

An oil bath geartrain for a powermill 12 according to a preferred embodiment of the present invention will now be described with reference to the accompanying drawings. The oil bath geartrain 10 includes a casing 20, a plurality of operational gears positioned within the confines of the casing 20, and means for directing oil to respective gear teeth and to a plurality of babbitt bearings 40.

The present invention is for use with a windmill that is configured to use collected wind energy to do work. More particularly, the windmill includes a plurality of blades 13 that rotate an input shaft 14 as they are pushed by wind currents. Then, after the wind energy is translated through a geartrain, the energy is used to rotate an output shaft 16 connected to a work piece such as a generator 18 (i.e., to produce electricity) or to do other work. Because the windmill is configured to do work, it will be referred to as a "powermill" and will be denoted with reference character 12.

The oil bath geartrain 10 for a powermill 12 may include a gear casing 20 having a bottom wall 21, a plurality of side walls 22 extending upwardly from a peripheral edge of the bottom wall 21, and a cover 23 (i.e., a top wall) that extends between upper edges of the plurality of side walls 22. Although the gear casing 20 as described may have the configuration of a box or perfect cube, a casing having other configurations or dimensions would also work. Collectively, the walls of the gear case 20 defines an interior area in which other components will be positioned. In any case, the gear casing 20 is configured to have an oil reservoir 25 for holding a predetermined volume of oil (as a lubricant) having a predetermined level that is always constant. The importance of the oil reservoir and the oil level (denoted as "O") will be understood more clearly as gears having teeth that dip into the oil and lift it to other locations are introduced and described later.

In an embodiment, one of the side walls 22 is configured to receive the input shaft 14 into the interior area defined by the gear case 20. As will be described, the rotational energy of the input shaft 14 will be passed through a gear train, such as to change the gear ratio (i.e., a comparison of the rates at which respective gears rotate), and eventually communicate to the output shaft 16. In an embodiment, the bottom wall 21 is configured to allow the output shaft 16 to exit the interior area of the gear case 20 and to extend to the generator 18.

Figure 7A:
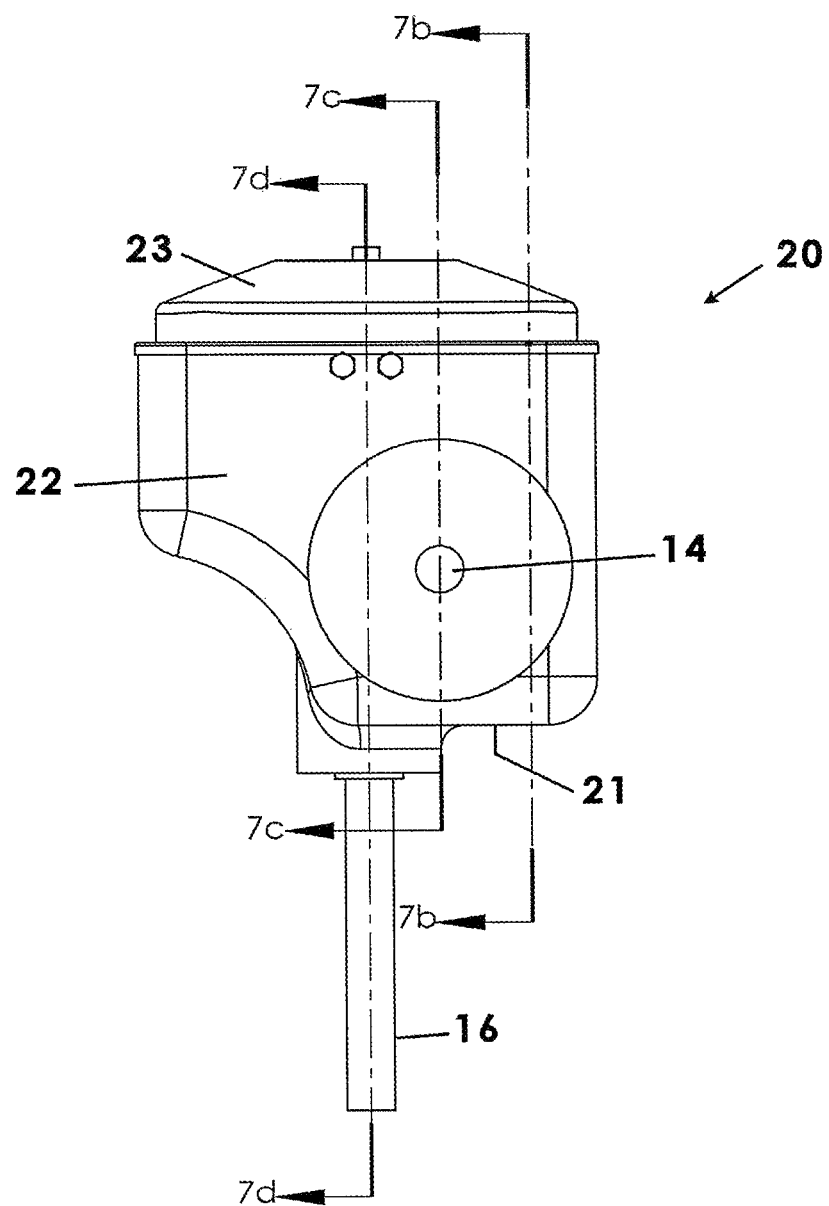
FIG. 7a is a side view of the oil bath geartrain as in FIG. 2.
Figure 7B:
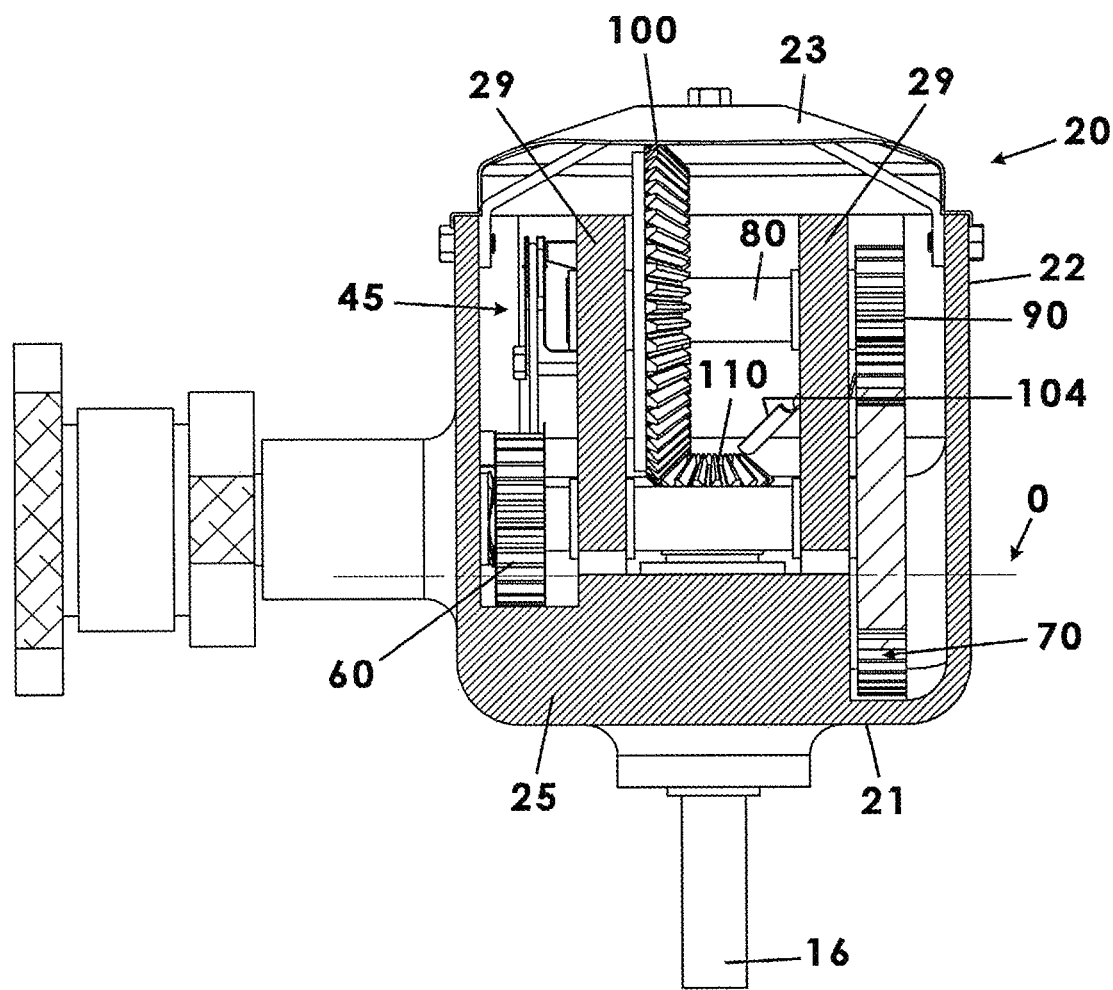
Figure 7C:
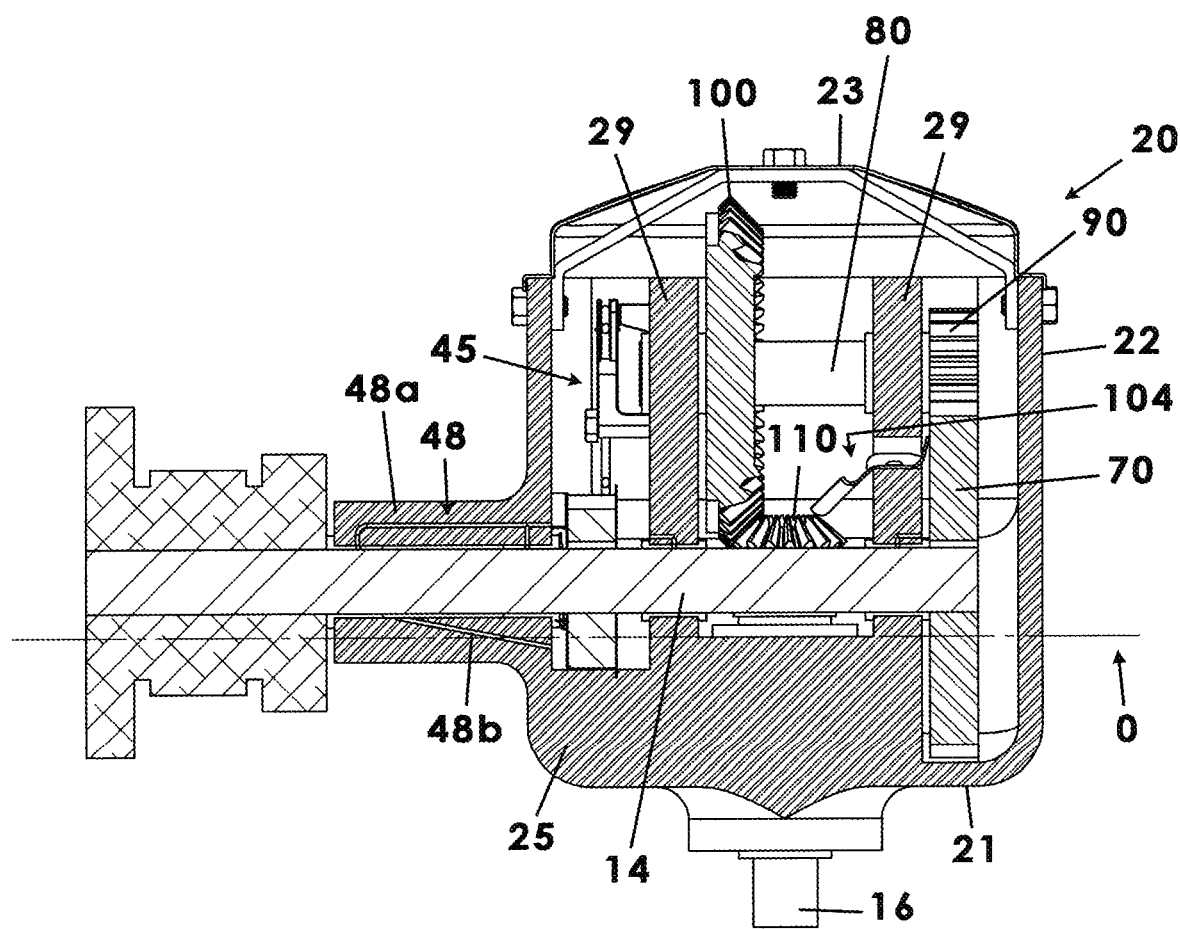
Figure 7D:
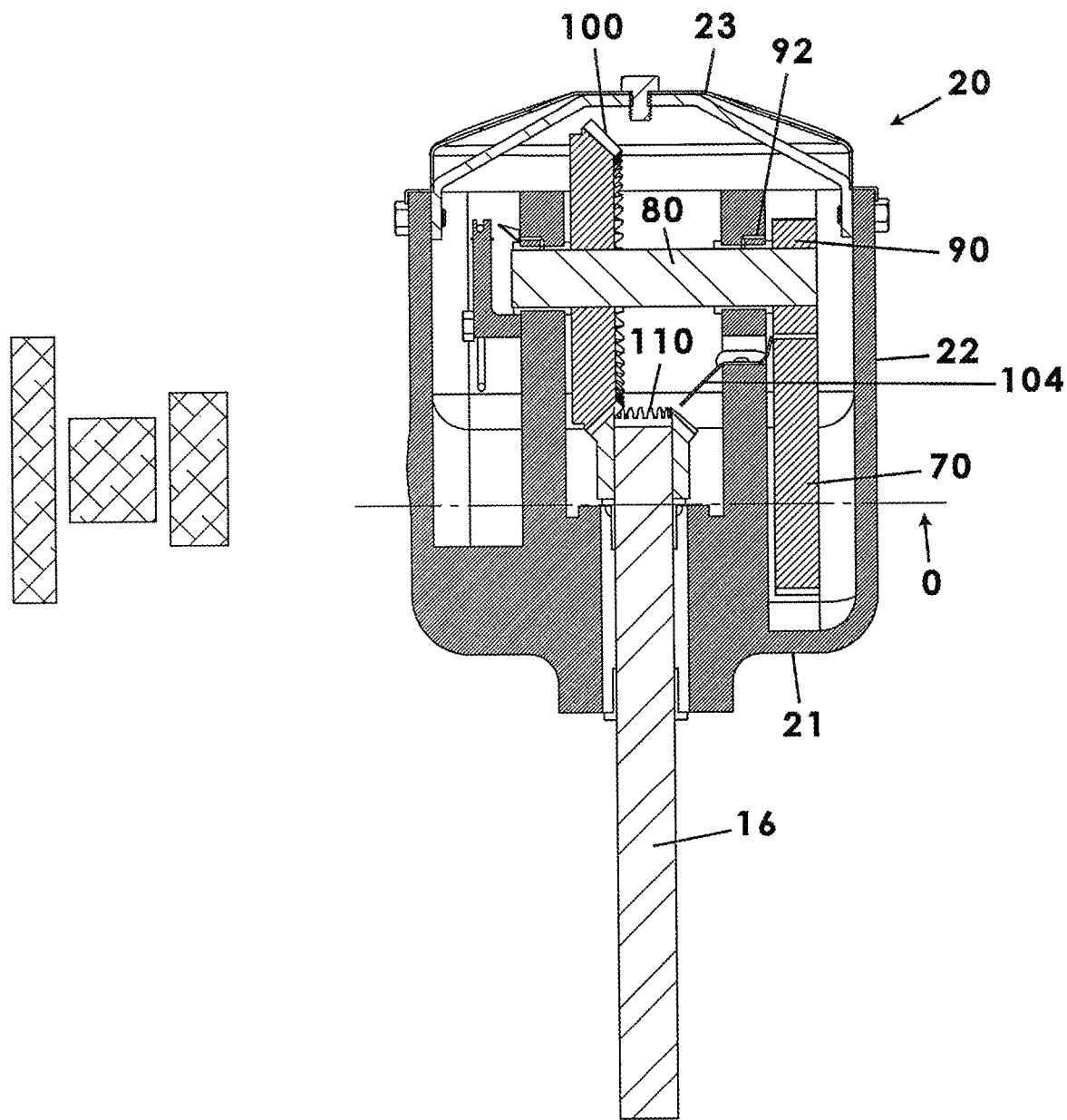

In another aspect, a plurality of bearing members may be positioned along respective shaft members and are configured to reduce friction caused by rotation of a respective shaft or interaction of respective gear teeth. Specifically, bearings referred to as "Babbitt bearings" or generically as "babbitt bearings" were used in automotive and windmill technologies well into the 1950's. Babbitt refers to a soft metal alloy originally patented by Isaac Babbitt in 1939. Babbitt is used as a lubricant to ease friction and prevent corrosion. As designed and illustrated in the present invention, babbitt bearing members 40a, 40b, 40c, 40d may be mounted in the gear casing 20 through which the input shaft 14 pass. Additional bearing members 40e and 40f may be mounted in the gear casing 20 at positions through which an intermediate shaft 50 extends. Specific bearing members will be referred to as additional components of the present invention are introduced below. Further, the casting of the gear casing 20 may include vertical walls 29 to which respective bearing members may be mounted to properly align with the rotational shafts that pass through them (FIGS. 7b, 7c, 7d).

The critical aspect of the present invention is the transfer or communication of lubrication, e.g., oil, to respective bearing members and respective gear teeth. An oil lift gear 60 is positioned within the interior area defined by the gear casing 20 and includes a plurality of oil lift gear teeth. The oil lift gear 60 is coupled to the input shaft 14 and positioned proximate the oil reservoir 25 and is configured such that the oil lift gear teeth will lift oil upwardly from below the oil level as it rotates. Further, the oil lift gear 60 may include or be associated with a scoop washer 62 to positioned immediately upstream adjacent the oil lift gear 60 as well as an oil control washer 63 immediately downstream adjacent the oil lift gear 60. As illustrated, a bearing member 40b may be coupled to the input shaft 14 immediately adjacent the scoop washer 62, it being understood that the scoop washer 62 is an interface configured to communicate oil from the oil lift gear teeth to the bearing member 40b. In addition, the oil lift gear 60 includes yet another interface for transferring oil to another bearing member 40e although a more detailed discussion of that interface will be deferred until later.

Figure 4:
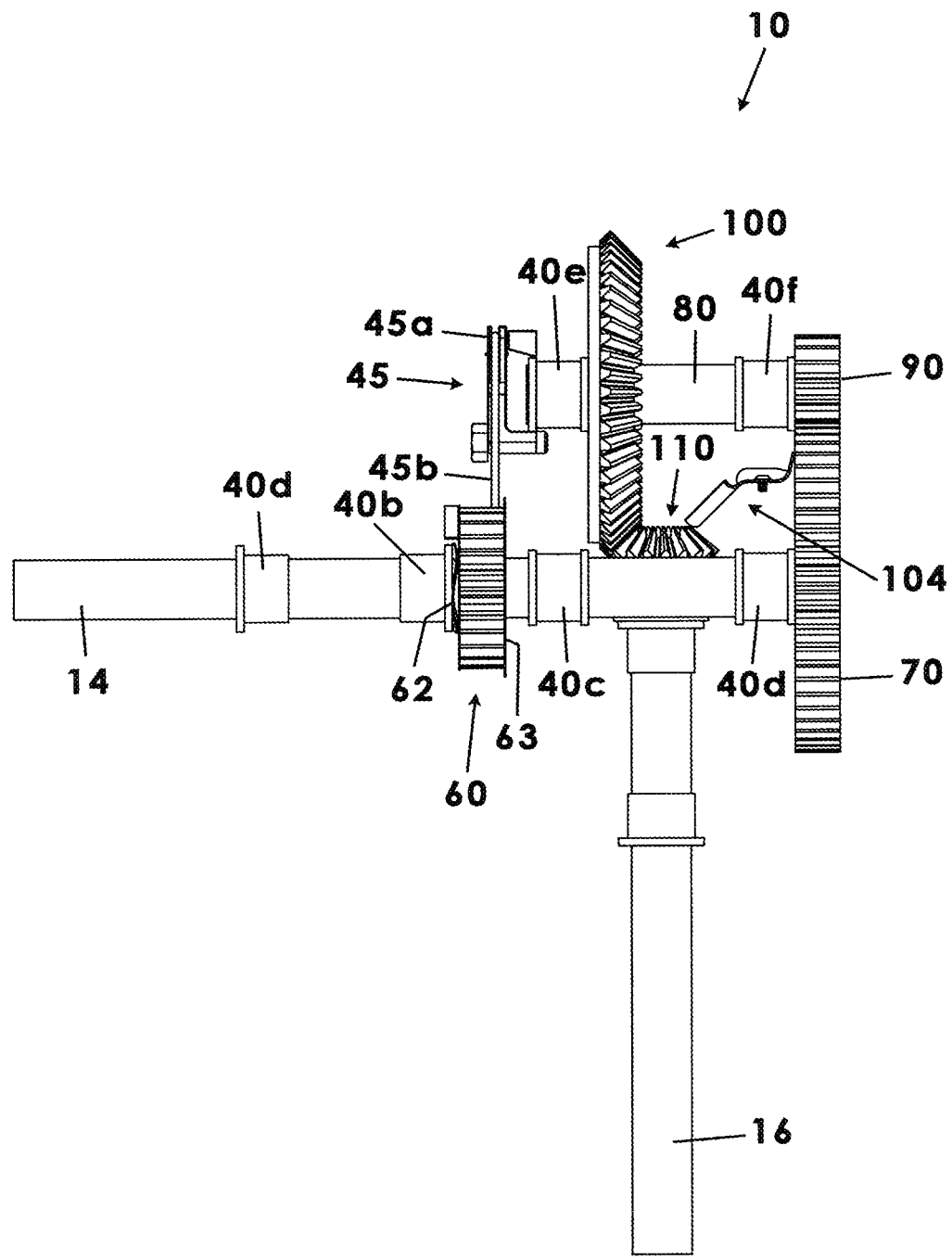
Figure 5:
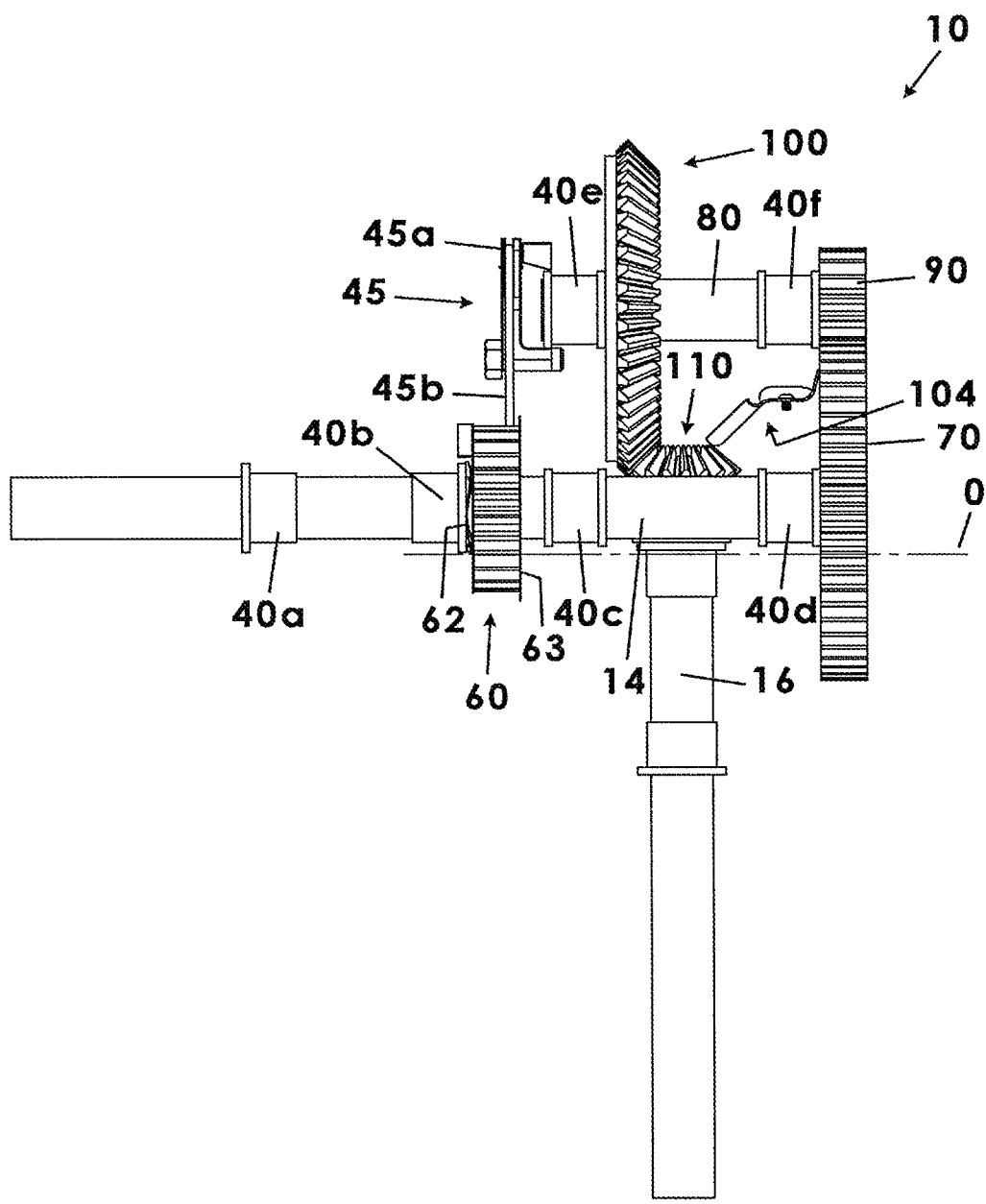
FIG. 5 is another front view of the oil bath geartrain as in FIG. 3.
Figure 6A:
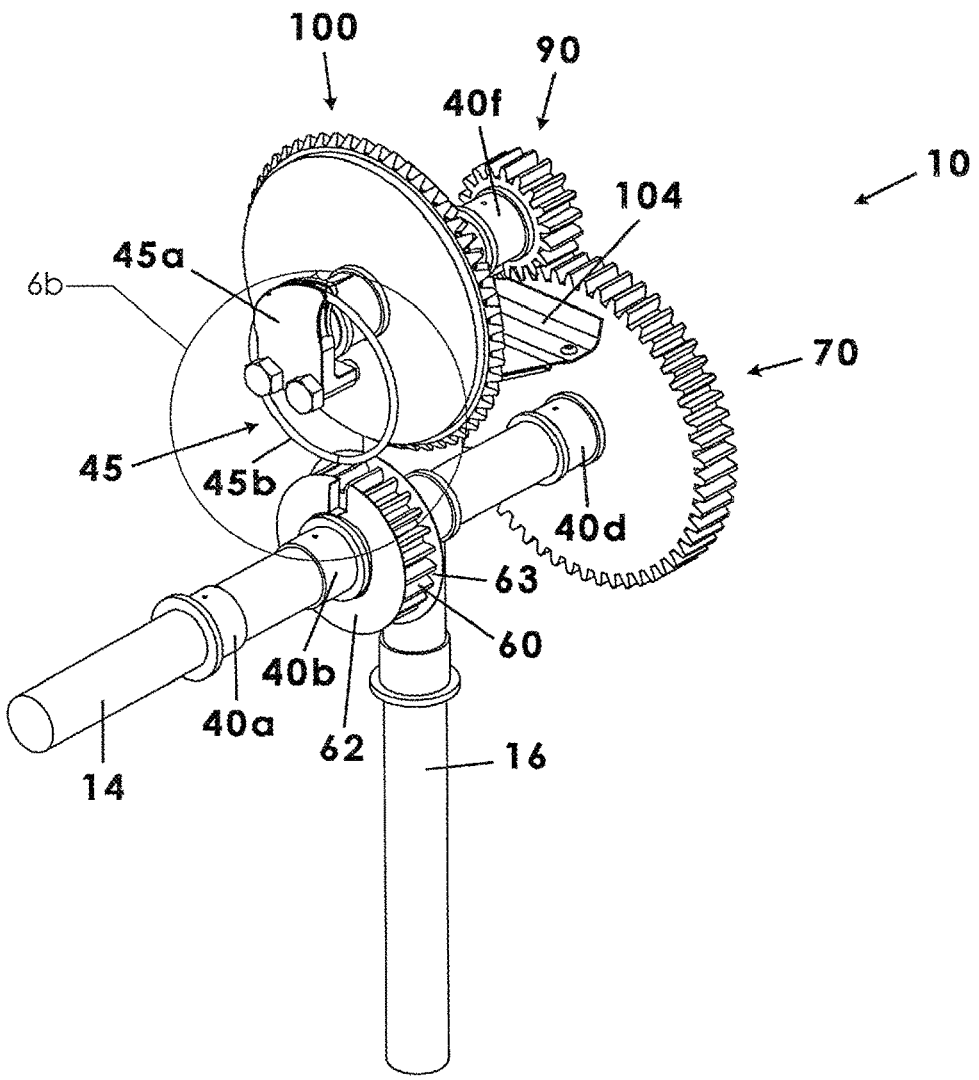
FIG. 6a is a perspective view of the oil bath geartrain from another angle as in FIG. 3.
Figure 6B:
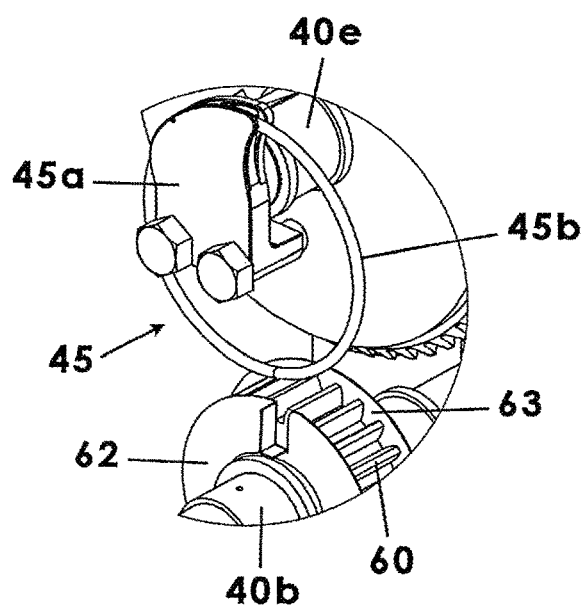

The input shaft 14 extends linearly downstream of the oil lift gear 60 (FIG. 4). An input shaft main gear 70 (also referred to as a main pinion gear 70) is coupled to a distal end of the input shaft 14 so as to rotate therewith. Preferably, the main pinion gear 70 is parallel to the oil lift gear 60. The main pinion gear 70 includes a plurality of main pinion gear teeth, the main pinion gear 70 being configured such that its teeth dip below the oil level of the oil reservoir so as to carry oil upwardly to lubricate other components as will be described below. Further, lubrication of bearing members 40c and 40d which are positioned along the input shaft 14 will also be described later.

The oil bath geartrain 10 includes an intermediate shaft 80 that is displaced from and parallel to the input shaft 14. An intermediate shaft pinion gear 90 may be coupled to a proximal end of the intermediate shaft 80, the intermediate shaft pinion gear 90 having a plurality of intermediate shaft pinion gear teeth in complementary engagement with the main pinion gear teeth of the main pinion gear 70. Obviously, the intermediate shaft 80 is rotated by operation of the intermediate shaft pinion gear 90 and main pinion gear 70 Accordingly, oil that is lifted by the teeth of the main pinion gear 70 is transferred to the teeth of the intermediate shaft pinion gear 90. Importantly, the bearing member 40f mounted to the intermediate shaft 80 receives oil as runoff from the teeth of the intermediate shaft pinion gear 90, such as via channel or tube 92 (FIG. 7d).

Next, a miter gear 100 (also referred to as an intermediate shaft miter gear 100) is fixedly mounted to the intermediate shaft 80 downstream from the intermediate shaft pinion gear 90 but at a point that is intermediate proximal and distal ends of the intermediate shaft 80. The miter gear 100 includes a plurality of miter gear teeth each having a beveled configuration. It is understood that combinations of bevel gears are used primarily to change directions of the transmission of rotational motion/energy. Accordingly, the gear train includes an output shaft miter gear 110 having a plurality of miter gear teeth complementary to the teeth of the larger miter gear 100, the outer shaft miter gear 110 being coupled to an upper end of the output shaft 16 described earlier as extending downwardly through a bottom wall 21 of the gear casing 20.

Another bearing member 40e may be coupled to a distal end of the intermediate shaft, i.e., downstream of the miter gear 100 (FIG. 4). To maintain constant lubrication of the bearing member 40e, an oil scraper assembly extends between the teeth of the oil lift gear 60 and the bearing member 40e. Essentially, the oil scraper assembly is the means for lifting oil from the oil reservoir 25 to the intermediate shaft bearing member 40e More particularly, the oil scraper assembly includes an oil ring 45 having a mounting portion 45a attached to said distal end of said intermediate shaft 80 and a ring 45b configured to scrape oil away from the teeth of the oil lift gear 60 and such that the ring 45b deposits the scraped oil into the intermediate shaft bearing member 40e. In this way, the oil ring 45 functions as an extension of the oil lift gear 60 but at a lesser cost and more reliably.

In another critical aspect, the complementary teeth of the output shaft miter gear 110 and the miter gear 100 are lubricated via another oil scraper assembly. In this instance, one or more oil scraper plates 104 extend between the teeth of the main pinion gear 70 and the teeth of the output shaft miter gear 110. In other words, respective ends or edges of the scraper plates 104 are configured to redirect a portion of the oil picked up in the teeth of the main pinion gear 70 to the teeth of the output shaft miter gear 110 where it is co-mingled (i.e., shared) with the teeth of the miter gear 100.

In an embodiment, there may be two additional bearing members 40c and 40d positioned along the input shaft 14 and through which the input shaft 14 passes again, these additional bearing members may include Bobbitt bearings so as to absorb or reduce the effects of friction caused by the rotation of the input shaft 14. In the present design, bearing members 40c and 40d are situated proximate the oil reservoir 25 and oil may be distributed thereto via one or more channels 48 or conduits. In an embodiment, the channels 48 may be segregated to include an inlet oil passage 48a from the reservoir 25 and an outlet or return channel 48b returning back to the reservoir 25.

Accordingly, it has been shown that the oil bath gear train causes the functional components of a geartrain associated with a windmill to be continuously bathed in oil in one of at least three ways. For instance, a bearing member 40b adjacent an oil lift gear 60 are continuously bathed in oil by way of a scoop washer 62 associated with the oil lift gear 60. Further, a bearing number 40c coupled to a distal end of an intermediate shaft 80 is continuously bathed in oil transferred from the gear teeth of the oil lift gear 60 via an oil ring as described above. Still further, another bearing member 40f situated on the intermediate shaft 80 is continuously bathed in oil that drains through tube 92 extending from respective teeth of the intermediate shaft pinion gear 90 (FIG. 7). Still further, the teeth associated with the output shaft miter gear 110 and with the larger miter gear 100 are continuously based in oil that is redirected or siphoned from the teeth of the main pinion gear 80 via the oil scraper plates 104 described above in more detail. Finally, additional bearing members 40c and 40d may be continuously bathed in oil via channels 48 which may either be cast into the casing 20 itself or inserted during manufacturing.

Once the gear casing 20 has been filled with oil to a predetermined level, all of the functional gears and bearings situated therein will be sufficiently bathed in oil such that regular servicing will be unnecessary for the windmill to function for years to come.

It is understood that while certain forms of this invention have been illustrated and described, it is not limited thereto except insofar as such limitations are included in the following claims and allowable functional equivalents thereof.

The invention claimed is:

1. An oil bath geartrain for a powermill of a type having an input shaft operatively coupled to a plurality of wind-collecting blades and an output shaft operatively coupled to a generator, comprising:
   a gear casing having a bottom wall, a plurality of side walls extending upwardly from said bottom wall, and a cover releasably positioned atop upper edges of the plurality of side walls, said gear casing defining an interior area having an oil reservoir configured to contain a volume of oil at a predetermined oil level,
   the input shaft extending through a predetermined side wall and configured to communicate rotary motion from the plurality of wind-collecting blades into the interior area and the output shaft extending through the bottom wall and configured to communicate rotary motion from the interior area to the generator;
   an oil lift gear operably coupled to the input shaft and positioned in said interior area and having oil lift gear teeth configured to pick up oil from below said predetermined oil level, said oil lift gear including a scoop washer;
   a first bearing member positioned along the input shaft proximate said oil lift gear, said scoop washer configured to transfer oil from said oil lift gear to said first bearing member;
   a main pinion gear operably coupled to the input shaft downstream from the oil lift gear and that includes main gear teeth configured to pick up oil from below said predetermined oil level;
   an intermediate pinion gear positioned in said casing and that includes a plurality of intermediate pinion gear teeth in operative communication with said main pinion gear teeth;
   an intermediate shaft having a proximal end operatively connected to said intermediate pinion gear for translating rotary motion away from said intermediate pinion gear;
   an intermediate shaft miter gear coupled to said intermediate shaft and configured to rotate therewith, said intermediate shaft miter gear having a plurality of intermediate miter gear teeth;
   an output miter gear operatively mounted to the output shaft and having a plurality of output miter gear teeth in operative communication with the plurality of intermediate miter gear teeth; and
   a first oil scraper assembly extending between said main pinion gear teeth and said output miter gear teeth for communicating oil therebetween.

2. The oil bath geartrain as in claim 1, further comprising:
   a second bearing member coupled to a distal end of said intermediate shaft and that is positioned downstream from said intermediate shaft miter gear;
   a second oil scraper assembly extending between said oil lift gear teeth and said second bearing member for communicating oil therebetween.

3. The oil bath geartrain as in claim 2, wherein said second oil scraper assembly includes an oil ring rotatably coupled to said intermediate shaft, said oil ring being in frictional communication with said oil lift gear teeth so as to be rotatable therewith and to communicate oil from said oil lift gear teeth to said second bearing member.

4. The oil bath geartrain as in claim 1, wherein said output miter gear is perpendicular to said intermediate shaft miter gear so as to change the direction of translated rotational energy.

5. The oil bath geartrain as in claim 1, wherein said first oil scraper assembly includes an oil scraper plate configured to transfer oil.

6. The oil bath geartrain as in claim 1, wherein said gear casing includes:
   an oil passage extending between said scoop washer and said first bearing member; and
   an outlet channel extending between said first bearing member and said oil reservoir.

7. The oil bath geartrain as in claim 2, further comprising a third bearing member and a fourth bearing member situated along said input shaft, said gear casing including oil passages extending directly between said oil reservoir and said third bearing member and said fourth bearing member.

8. The oil bath geartrain as in claim 2, further comprising another bearing member coupled to said intermediate shaft proximate said intermediate pinion gear, said another bearing member being configured to receive oil that drains from the said plurality of intermediate pinion gear teeth.

9. An oil bath geartrain for a powermill of a type having an input shaft operatively coupled to a plurality of wind-collecting blades and an output shaft operatively coupled to a generator, comprising:
   a gear casing having a bottom wall, a plurality of side walls extending upwardly from said bottom wall, and a cover releasably positioned atop upper edges of the plurality of side walls, said gear casing defining an interior area having an oil reservoir configured to contain a volume of oil at a predetermined oil level, one of said plurality of side walls being configured to receive the input shaft into said interior area and said bottom wall being configured to allow the output shaft to extend out of said interior area;

an oil lift gear positioned in said interior area and operably coupled to the input shaft so as to rotate therewith, said oil lift gear having oil lift gear teeth configured to pick up oil from below said predetermined oil level, said oil lift gear having a scoop washer;

a first bearing member coupled to the input shaft proximate said oil lift gear, said scoop washer configured to transfer oil from said oil lift gear to said first bearing member;

a main pinion gear operably coupled to the input shaft downstream from the oil lift gear that includes a plurality of main gear teeth configured to pick up oil from below said predetermined oil level;

an intermediate pinion gear positioned in said casing that includes a plurality of intermediate pinion gear teeth in operative communication with said main pinion gear teeth, said main pinion gear and said intermediate pinion gear sharing a common geometric plane;

an intermediate shaft having a proximal end operatively connected to said intermediate pinion gear for translating rotary motion away from said intermediate pinion gear;

an intermediate shaft miter gear coupled to said intermediate shaft and configured to rotate therewith, said intermediate shaft miter gear having a plurality of intermediate miter gear teeth;

an output miter gear operatively mounted to the output shaft and having a plurality of output miter gear teeth in operative communication with the plurality of intermediate miter gear teeth, said output miter gear being generally perpendicular to the intermediate shaft miter gear so as to change a direction of rotational motion;

a first oil scraper assembly extending between said main gear teeth and said output miter gear teeth for communicating oil therebetween;

a second bearing member coupled to a distal end of said intermediate shaft and that is positioned downstream from said intermediate shaft miter gear;

a second oil scraper assembly extending between said oil lift gear teeth and said second bearing member for communicating oil therebetween, said second oil scraper assembly including an oil ring rotatably coupled to said intermediate shaft, said oil ring being in frictional communication with said oil lift gear teeth so as to be rotatable therewith and so as to communicate oil from said oil lift gear teeth to said second bearing member.

10. The oil bath geartrain as in claim 9, wherein said first oil scraper assembly includes at least one oil scraper plate.

11. The oil bath geartrain as in claim 9, wherein said gear casing includes:

an oil passage extending between said scoop washer and said first bearing member; and an outlet channel extending between said first bearing member and said oil reservoir.

12. The oil bath geartrain as in claim 9, further comprising a third bearing member and a fourth bearing member situated along said input shaft, said gear casing including oil passages extending directly between said oil reservoir and said third bearing member and said fourth bearing member for supplying oil thereto.

13. The oil bath geartrain as in claim 9, further comprising another bearing member coupled to said intermediate shaft proximate said intermediate pinion gear, said another bearing member being configured to receive oil that drains from said plurality of intermediate pinion gear teeth.

* * * * *